United States Patent
Schuler

(10) Patent No.: US 8,480,940 B2
(45) Date of Patent: Jul. 9, 2013

(54) DEVICE FOR INJECTION A STRAND OF A PASTE-LIKE MASS INTO THE INTERMEDIATE SPACE BETWEEN GLASS PANES OF AN INSULATED GLASS PANE

(75) Inventor: Peter Schuler, Tiefenbronn (DE)

(73) Assignee: Bystronic Lenhardt GmbH, Neuhausen-Hamberg (DE)

( * ) Notice: Subject to any disclaimer, the term of this patent is extended or adjusted under 35 U.S.C. 154(b) by 0 days.

(21) Appl. No.: 12/739,240

(22) PCT Filed: Oct. 24, 2008

(86) PCT No.: PCT/EP2008/009022
§ 371 (c)(1),
(2), (4) Date: Sep. 7, 2010

(87) PCT Pub. No.: WO2009/053090
PCT Pub. Date: Apr. 30, 2009

(65) Prior Publication Data
US 2010/0320644 A1    Dec. 23, 2010

(30) Foreign Application Priority Data
Oct. 24, 2007 (DE) .................. 10 2007 051 610

(51) Int. Cl.
*B29C 45/14* (2006.01)

(52) U.S. Cl.
USPC ............................ 264/261; 264/263; 425/114

(58) Field of Classification Search
USPC .................................. 264/261, 263; 425/114
See application file for complete search history.

(56) References Cited

U.S. PATENT DOCUMENTS

| 3,203,675 | A |   | 8/1965  | Ward |
|-----------|---|---|---------|------|
| 3,902,850 | A |   | 9/1975  | Lehnert |
| 4,060,570 | A |   | 11/1977 | Paul, 3rd |
| 4,675,126 | A | * | 6/1987  | Unger et al. ................. 134/38 |
| 4,886,643 | A |   | 12/1989 | Feist |
| 4,986,443 | A | * | 1/1991  | Saur et al. ..................... 222/1 |
| 5,462,199 | A |   | 10/1995 | Lenhardt |
| 5,849,832 | A | * | 12/1998 | Virnelson et al. ........... 524/512 |
| 6,260,577 | B1|   | 7/2001  | Keller |
| 8,101,251 | B2| * | 1/2012  | Scott et al. .................... 428/34 |
| 2003/0162882 | A1 | * | 8/2003 | Grimm et al. ............... 524/493 |
| 2004/0085854 | A1 | * | 5/2004 | Pauser et al. .............. 366/172.1 |
| 2009/0161480 | A1 |   | 6/2009 | Voss |
| 2012/0080136 | A1 | * | 4/2012 | Schuler ........................ 156/99 |

FOREIGN PATENT DOCUMENTS

| DE | 35 42 767 A1 | 6/1987 |
|----|--------------|--------|
| DE | 39 29 608 A1 | 3/1990 |
| DE | 299 07 573 U1 | 10/2000 |
| EP | 1 375 008 A2 | 6/2003 |
| GB | 908519       | 10/1962 |
| GB | 1524848      | * 9/1978 |

* cited by examiner

*Primary Examiner* — Jill Heitbrink

(57) ABSTRACT

A device for injecting a strand of a paste-like mass, which is formed from a plurality of constituents, into the intermediate space between two glass plates of an insulated glass pane. The device includes a nozzle having a storage unit for each of the constituents of the paste-like mass, which is connected to the nozzle by means of a supply path, in which provision is made for a dynamic mixer.

18 Claims, 3 Drawing Sheets

DEVICE FOR INJECTION A STRAND OF A PASTE-LIKE MASS INTO THE INTERMEDIATE SPACE BETWEEN GLASS PANES OF AN INSULATED GLASS PANE

The invention is based on a device known from DE 35 42 767 A1 and from DE 39 29 608 A1, which disclose a device for supplying two paste-like substances in predetermined composition from two reservoirs to a nozzle, by means of which the edge joint of an insulated glass pane is sealed. The two paste-like substances, which are the two components of a two-component sealing and adhesive mass, are supplied out of barrels by means of piston pumps in each case into an intermediate storage unit, which is a piston-cylinder unit, out of which a first piston presses the main component (base component) of the sealing and adhesive mass and a second piston presses the additional component (hardener or curing agent) synchronously to the main component. Main component and additional component are supplied on the supply path between the piston-cylinder unit and the nozzle by means of a static mixer, in which they are mixed with one another.

Once the supply of the main component and of the additional component in the piston-cylinder unit is almost depleted, the sealing process of the insulated glass pane must be interrupted for the refilling of the main component and of the additional component into the respective piston-cylinder unit. A sealing of insulated glass panes is not possible during this time. If interruptions of the sealing process are to be avoided, the storage volume of the piston-cylinder unit must be chosen to be as large as possible. Due to the inevitable compressibility of the constituents of the sealing and adhesive mass, it becomes more difficult to accurately meter it to such an extent that neither too much nor too little of the mass reaches into the edge joint of the insulated glass pane, the larger the storage volume. Furthermore, the weight of the piston-cylinder units, the energy demand for the actuation thereof, the pressure onto the material to be supplied and thus also the weight for the drives of the pistons of the piston-cylinder units, increase with increasing storage volumes.

To keep the supply paths from the piston-cylinder units to the nozzles to be short, it is known to arrange the nozzle and the piston-cylinder units feeding said nozzle on a common support. Said support must be movable, so as to be capable of moving the nozzle along the edge of the insulated glass panes. The effort for the actuating drive also increases with the weight of the piston-cylinder units.

The instant invention is based on the object of finding a way to be able to reduce the effort for the sealing of insulated glass panes.

SUMMARY OF THE INVENTION

The device according to the invention for injecting a strand of a paste-like mass into the intermediate space between two glass plates of an insulated glass pane—also referred to hereinbelow as sealing device—has a storage unit for each of the constituents of the paste-like mass and a nozzle, which is connected to the storage unit by means of a supply path, in which provision is made for a dynamic mixer. The paste-like mass serves the purpose of sealing the interior of the insulated glass pane from the permeation of water vapor and/or to establish a lasting and sufficiently solid bond between the two glass plates. A curing mass, which is formed from at least two constituents, which are mixed with one another, is used for a sufficiently solid bond. Initially, the mass created by means of the mixing is paste-like and then cures gradually, whereby it solidifies. Curing two-constituent sealing and adhesive masses on the basis of Thiokol are particularly common for the sealing of the edge joint of insulated glass panes. They cure into polysulfides.

For mixing the constituents of the paste-like mass, which is injected between the two glass plates, a static mixer has always been used in devices for sealing insulated glass panes, the glass plates of which are adhered to one another at the edge. The instant invention completely turns away from this by using a dynamic mixer. Many important advantages are attained by doing so:

The pressure loss suffered by the paste-like mass when it is supplied through a dynamic mixer is considerably less than the pressure loss it suffers in a static mixer. In a sealing device, which encompasses a static mixer, the constituents of the paste-like mass must be ejected from that storage unit, from which the static mixer is fed, at a pressure, which is typically 200 bar to 220 bar in the case of distances between the glass plates of an insulated glass pane, which are not too small. From the pressure of 200 bar to 220 bar, the largest portion drops on the way to the nozzle. The paste-like mass arrives at the nozzle with a pressure, which is typically only 70 bar to 80 bar, so that the pressure loss until then is approximately $\frac{2}{3}$ of the initial pressure. The lion's share of the pressure loss is caused by the static mixer. At least a large portion of the pressure loss, which otherwise occurs in the case of a static mixer, can be avoided with the use of a dynamic mixer.

Due to the highly reduced pressure loss, the power demand for pressing out the paste-like mass decreases.

Reduced initial pressure and reduced power demand for pressing out the paste-like mass allow for the use of lighter storage units and lighter supply devices, e.g. hydraulic piston pumps.

Due to the weight saving, the storage units, the supply devices and the mixer can be moved easier together with the nozzle; the drive for the common movement can be designed to be weaker, which saves additional weight.

The movement of lighter storage units and lighter supply devices allows for lighter fasteners and guides for these things, which once again saves weight.

With the reduction of the mass of the sealing device, which is to be moved, the tendency thereof to undesired oscillations decreases and the damping thereof is facilitated.

Lower pressures, lower power demand and lower masses lead to an increased durability, in particular in the case of the storage units and the hydraulic supply devices as well as in the case of the seals thereof.

Based on the same mixing results, the capacity of the dynamic mixer and the dwell time of the paste-like mass are considerably smaller in the dynamic mixer than in the static mixer. The volume of the paste-like mass, which is located between the storage units and the nozzle, thus decreases. Due to the smaller volume, the impact of the compressibility of the paste-like mass onto the metering accuracy decreases, so that the latter increases.

Due to the decrease of the through-put time of the paste-like mass through the mixer, the extent of the setting of the paste-like mass, which appears on the way to the nozzle, decreases.

Due to the fact that the dynamic mixer can manage with a lower capacity than a static mixer and due to the fact that the dwell time of the material in the dynamic mixer is shorter than in the static mixer, the danger for material to accumulate and bind in dead spots of the mixer, is not as high as in a static mixer. The driven mixing tool, which keeps the paste-like mass in motion in the dynamic mixer, contributes to this advantage.

Static mixers in sealing devices for insulated glass panes typically have a length of 80 cm to over 1 m. A dynamic mixer comprising a corresponding capability as a static mixer is much shorter and more compact than the static mixer. The overall sealing device can thus be assembled in a more compact manner, thus once again lowering its tendency to oscillate.

A sealing device according to the invention comprising a dynamic mixer can be produced more cost-efficiently than a common sealing device comprising a static mixer.

Sealing masses for insulated glass panes are more or less dilatant, that is, their viscosity increases with increasing pressure, to which the mass is subjected. Due to the fact that a sealing device according to the invention can make do with less pressure than known sealing devices for insulated glass panes, the dilatant sealing masses in a sealing device according to the invention have a lower viscosity in a common sealing device. They can thus be processed more easily by means of a device according to the invention. This already applies to the Thiokol, which is most widely used. However, the advantage of the invention is particularly pronounced in response to the processing of two-component sealing masses on the basis of silicone, which set to a silicone caoutchouc. At best, these sealing masses can still be processed on a common sealing device, which is equipped with a static mixer, when only relatively low throughputs of the paste-like sealing mass are required at the nozzle, as in the case of insulated glass panes, in the case of which the distance between the glass plates is not more than 10 mm. Today, insulated glass panes, in the case of which the distance between the glass plates is 15 mm to 25 mm, are produced predominantly, due to the fact, however, that the heat insulation of an insulated glass pane becomes better, the larger the distance of the glass plates from one another in the insulated glass pane. If silicone, which binds to a silicone caoutchouc is to be used as sealing mass, this was only possible with common sealing devices when a caving of the sealing speed was accepted, that is, the required decrease of the pressure in the sealing device resulted in a corresponding decrease of the sealing speed, which results in an extension of the clock time of the insulated glass production line. With a sealing device according to the invention, however, it is possible to process the silicone with throughputs, which are as large as necessary for insulated glass panes comprising a large distance between the glass plates, so as to be able to fully utilize the short clock times of modern insulated glass production lines. The instant invention is thus not only suitable for the use of Thiokol as sealing mass, but also for the use of polyurethane and in particular for the use of silicone, which cures into silicone caoutchouc as two-constituent sealing mass.

Preferably, the dynamic mixer has a cylindrical or truncated cone-shaped mixing tube, in which a drivable mixing shaft is arranged as mixing tool, which is provided with mixing elements, which protrude from the mixing shaft. Preferably, the mixing elements protrude radially from the mixing shaft and reach closely onto the interior peripheral wall of the mixing tube, so that the entire clear cross section of the mixing tube is reached by the mixing elements and so that the materials, which are to be mixed, cannot accumulate and cure in the mixing tube.

The mixing elements can be arranged irregularly around the mixing shaft. They can also be arranged on the mixing shaft in a plurality of circular arrangements behind one another. It is particularly preferred when the mixing elements are arranged around the mixing shaft in a helical manner, because it can be best ensured therewith that all areas of the surface of the mixing tube located on the inside are passed over by the mixing elements.

The mixing elements can have different shapes: they can be rods, the cross sections of which are embodied so as to be round or square. They can be blades or clamps. Mixing elements, which are embodied in a shovel-like manner, are also advantageous. In particular, they can be embodied in such a manner that they have surfaces pointing in supply direction, which are arranged at an angle, which differs by 90° from the longitudinal axis of the mixing shaft, so that they effect an advance of the paste-like mass in response to a driven mixing shaft. The pressure loss, which the material suffers in the dynamic mixer, can thus be highly reduced or can be done away with. It is even possible to again compensate for a pressure loss, which was suffered on the way from the storage unit to the dynamic mixer.

It is particularly preferred to combine mixing elements, which can create an advance, with other mixing elements, which do not create an advance, but which have a greater mixing effect.

A mixing tube, in which one or two worms are arranged so as to be capable of being driven, is also possible as a dynamic mixer.

In the case of the device according to the invention, the flow cross section of the mixer and its drive power are advantageously designed for a throughput of the paste-like mass of at least 0.5 liters per minute, better yet for a throughput of the paste-like mass of at least 2 liters per minute, particularly preferably for a throughput of at least 3 liters per minute. The latter makes the device particularly suitable for the rapid sealing of insulated glass panes comprising a large distance between the glass plates.

In a particularly advantageous development of the invention, two arrangements, which consist of a storage unit and of a displacement device engaging therewith and which are connected to the nozzle, are available in each case for the constituents of the paste-like mass, which is to be injected into the intermediate space between two glass plates, and they are operated in the opposite direction, that is, the one storage unit is refilled while a constituent of the mass is output from the other storage unit into the first supply path, which leads to the nozzle. This has further considerable advantages:

By means of operating in the opposite direction, the content of that storage unit, which is refilled at that moment, increases, the more the content in the other storage unit decreases. The constituents of the paste-like mass are thus always available, so as to inject them into the intermediate space between two glass plates of an insulated glass pane.

The time required for switching over the storage units from refilling to outputting and from outputting to refilling is much shorter than the time required to refill an emptied storage unit again.

Due to the fact that the time required for the filling of a storage unit is not lost from the time, in which the paste-like mass can be injected into the intermediate space between two glass plates of an insulated glass pane, the storage unit volume of the storage unit can be kept small.

Due to the fact that the storage unit volume can be kept small, the storage units can be designed so as to be small and light, so that the expenditure of energy for the activation thereof and for the handling thereof is correspondingly small.

Due to the fact that the storage volume of the storage units can be kept small, the impact of the compressibility on the metering accuracy of the paste-like mass and the constituents thereof is correspondingly small.

The invention provides for a compact sealing device for insulated glass panes, which can be controlled well.

The invention is particularly suitable for two-component sealing and adhesive masses, such as the polysulfides (Thiokol) known in the insulated glass production, which consist of a main component and an additional component, which, on the way to the nozzle, are mixed with one another at a ratio of approx. 9 to 1 into a two-component paste-like mass, which then cures progressively. The invention is furthermore particularly suitable for two-component curing masses on the basis of polyurethane and silicone.

In response to the sealing of an insulated glass pane, the curing mass is injected into the edge joint of the insulated glass pane, which is defined by two glass plates and by the exterior of a spacer, which connects the glass plates, in such a manner that said curing mass extends either as a uniform strand from the one glass plate to the opposite glass plate or—in the case of sufficiently pressure and tension-resistant spacers—that it is filled only into the grooves between the exterior of the spacer and the two glass plates. In the last-mentioned case, two separate strands of the sealing mass are located next to one another in the edge joint. Two such strands can be created by means of a nozzle, which has two openings, which are located next to one another.

In the event that the mass, which is injected into the intermediate space between the glass plates of an insulated glass pane, consists of two constituents, which form a curing mass after being mixed, the dynamic mixer, which mixes the two constituents with one another while they are supplied through it, is then located on the first supply path between the two storage units, from which the two constituents come and the nozzle, from which the strand of the paste-like mass finally escapes.

The nozzle can have one or more than one opening. Operating with only one opening is possible when a uniform strand is to be formed from the paste-like mass. A nozzle comprising two openings is not only possible when—as mentioned—two strands located next to one another are to be formed, the one of which connects the spacer to the one glass plate and other one of which connects the spacer to the other glass plate. One nozzle comprising two openings is also possible when a two-layer composite strand is to be formed from two different paste-like masses.

Preferably, the arrangements, which are operated in pairs in the opposite direction and which consist of a storage unit and of a displacement device, are operated synchronously, so that when something is output from one storage unit, the other storage unit is always refilled to the same extent. Basically, it is also possible, however, to deviate from a strict synchronization and to not use, e.g., the entire time during which a mass is output from a storage unit to refill the other storage unit. Instead, the refill time could be shorter, when the throughput is instead increased correspondingly in response to the refilling. Such a process, however, would require an increased effort and is thus not preferred.

In the event that a plurality of paste-like masses or a plurality of constituents of a paste-like mass are processed, provision should then be made for each mass or for each constituent, which is metered separately, respectively, for a pair of arrangements, which are operated in the opposite direction and which in each case consist of a storage unit and of a displacement device. In this case, each of these arrangements is preferably operated synchronously.

Advantageously, the storage units, which are assigned to one another for a pair-wise operation in the opposite direction, have the same size. At the onset of an injection process, one of the storage units is then at least half full, so that half of the volume of one of the two storage units is basically available for an uninterrupted injection process. In an advantageous development of the invention, the injection process, in the case of which the paste-like mass and the respective constituents of which are output, is in each case output from that storage unit of a pair of arrangements, which consist of a storage unit and of a displacement device, which contains the largest quantity of the constituents of the paste-like mass. The probability that the upcoming injection process can be completed without interruptions is then at its peak.

In the case of a rectangular insulated glass pane it is known to briefly interrupt the injection process at the corners of the insulated glass pane while the nozzle is moved around the corner. This brief interruption can be used to switch over the two storage units of a pair, so that that storage unit, which has output material until one corner of the insulated glass pane has been reached, is refilled, while the other storage unit, which had been refilled until reaching the corner, then outputs material.

Another advantageous development of the invention is to control the injection process in such a manner that the quantity of the paste-like mass and its constituents, which is required in each case between two breaks of the movement of the nozzle, is determined in advance and, as far as possible, is output from that storage unit of a pair of arrangements, which consist of a storage unit and a displacement device, from which this is possible without interruptions. In the event that this is possible in the case of both storage units, that storage unit containing the smaller quantity is preferred for outputting the material. This has two advantages: on the one hand, an extensive exchange of the material in the storage units is promoted and an aging of the material in the storage units is thus counteracted. On the other hand, in the event that a storage unit was virtually emptied, the other storage unit is virtually full and is available for a longer interruption-free injection process, as it can be considered for large-size insulated glass panes.

The quantity of the paste-like mass, which is required between two breaks in the movement of the nozzle, can easily be determined in advance in a timely, automatically-controlled production line for the assembly of insulated glass panes, in that the length, width and depth of an edge joint of the insulated glass pane are determined in advance. This can either take place by way of measurement techniques or in that the data of the insulated glass pane, which is to be assembled, are input in advance into the controller of the production line. These data are available in the work preparation.

The constituents of the paste-like mass, which are refilled, stem from a plurality of containers, which can be connected to the storage unit, which is to be refilled, via a second supply path, in which a pump is arranged. For this purpose, the storage units are provided with a corresponding connection possibility for refilling. Preferably, the refilling takes place via an access, which is also used for the outputting of material from the storage unit. To realize this double use, it is sufficient to access the storage unit via a control valve, which alternately connects the access to the first supply path to the nozzle and to the second supply path, which comes from the container. The control valve can also have a third position, in which it blocks the access to the storage unit.

There are different possibilities for embodying the storage units. One possibility is to use a container as a storage unit, in which a bellows is accommodated as a displacement device, which can be enlarged and reduced hydraulically. Preferably, the displacement device is not embodied as a bellows, but as a piston, in particular as a plunger piston, and dips into a storage unit, which is preferably embodied as a cylinder. In response to the refilling of the storage unit, the piston is displaced by means of the material permeating into the storage unit. After the switch-over of the control valve, which is assigned to the storage unit, the piston is advanced and displaces the material out of the storage unit into the "first" supply path, which leads to the nozzle.

The storage volume is preferably chosen in such a manner that a half-full storage unit is sufficient to seal one of the four edge joints of a rectangular insulated glass pane, which has common dimensions, that is, to inject one or two strands between two glass plates of the insulated glass pane close to the edge. Most of the insulated glass panes have an edge length of less than 1.5 m, so that a storage unit comprising a volume, which is sufficient to seal an edge joint comprising a length of 2 m to 3 m, can seal an edge joint comprising a length of at least 1 m to 1.5 in consideration of the fact that at least one of the two cooperating storage units is at least half full. In the case of most of the insulated glass panes available in practice, each of the four edge joints can thus be sealed without interruption in the case of a storage volume, which is chosen in such a manner. Preferably, the storage volume is not greater than is required for the sealing of an edge joint comprising a length of 5 m to 6 m, which, in consideration of the fact that one of the two storage units is at least half full, means that sufficient material is always available to seal at least one edge joint comprising a length of 2.5 m to 3 m. In the event that in the case of larger insulated glass panes, the quantity available in the storage unit is not sufficient to seal an edge joint without interruption, this is acceptable, because such insulated glass panes are rarer, so that the additional expenditure of time for a brief interruption of the sealing process, which can occur in response to the sealing of a longer edge joint, is of no particular consequence for the point balance in response to the production of a large number of insulated glass panes.

The invention provides for such compact sealing devices that storage units can be assigned to a nozzle not only for the constituents of a single sealing mass, such as Thiokol, e.g., on a common moved support, but a larger number of storage units for the constituents of different sealing masses, e.g. for Thiokol and polyurethane or for Thiokol and silicone or for all three sealing masses. Even in such a case, the sealing device still does not reach the weight of a common sealing device for only one sealing mass. By means of one or a plurality of valves, in particular by means of a control valve, such a sealing device can be switched over comfortably, in a time-saving manner and in a cost-efficient manner from the processing of a sealing mass to the processing of another sealing mass, if necessary while changing to another dynamic mixer and to another nozzle.

BRIEF DESCRIPTION OF THE DRAWING

Further features and advantages of the invention result from the enclosed description of exemplary embodiments of the invention, which are illustrated in the enclosed drawings. The same or corresponding parts are identified with corresponding reference numerals in the exemplary embodiments.

DETAILED DESCRIPTION

Figure 1:
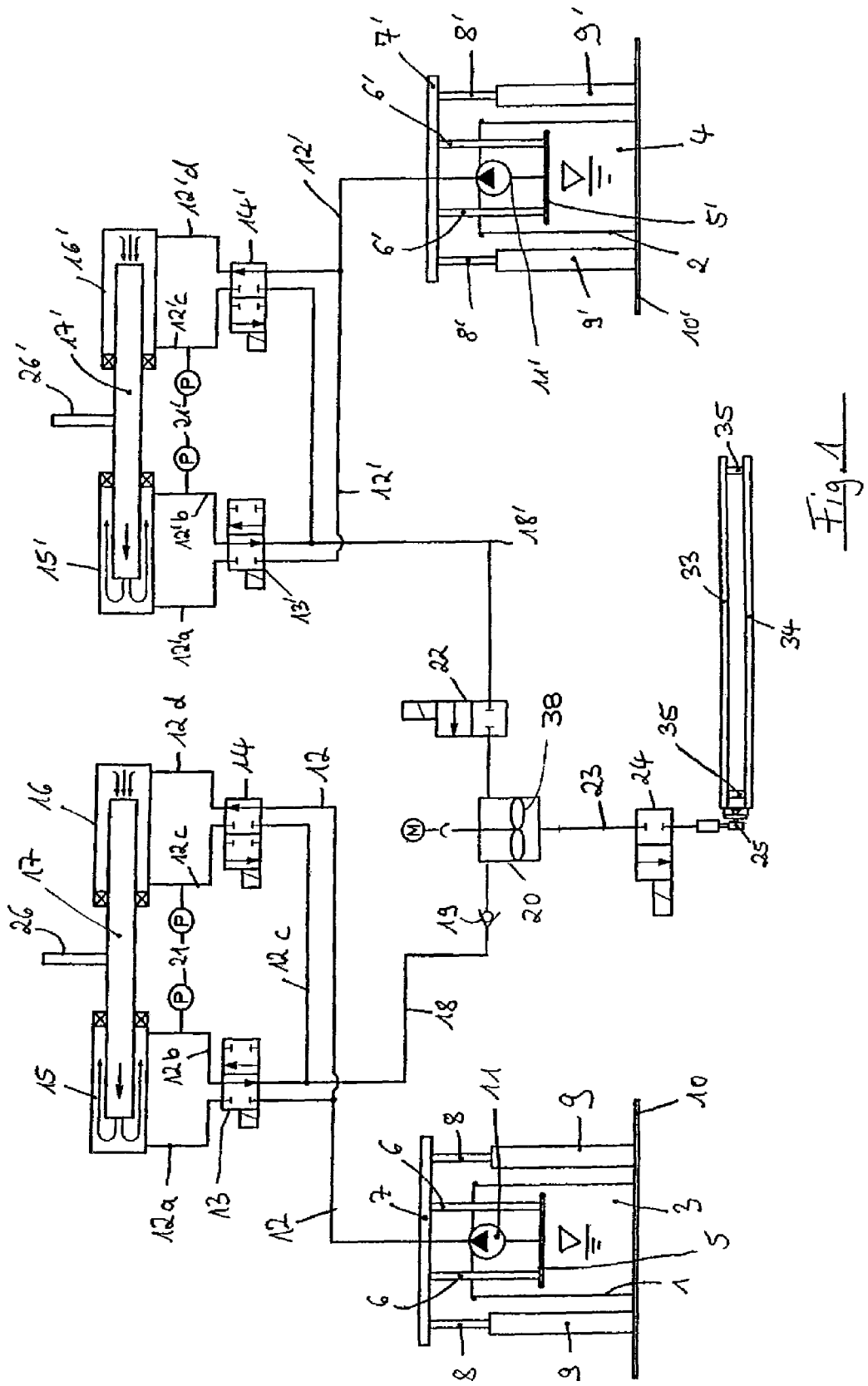
FIG. 1 shows a schematic illustration of a device for injecting a paste-Like mass into the intermediate space between two glass plates of an insulated glass pane.

FIG. 1 shows a container 1 for a first constituent 3 of a paste-like mass and a container 2 for a second constituent 4 of the paste-like mass. The two containers are barrels, e.g., the lids of which have been removed. A follow-up plate 5 is located on the first constituent 3 in the container 1. Two rods 6 lead vertically up from the follow-up plate 5 to a traverse 7, which connects not only the two rods 6, but also two piston rods 8, which belong to two hydraulic cylinders 9, which are anchored on a base plate 10, on which the container 1 stands. By retracting the piston rod 8 into the hydraulic cylinders 9, the traverse 7 pushes the follow-up plate 5 onto the reservoir of the constituent 3 of the paste-like mass, which is located in the container 1. The constituent 3 is thus pushed through an opening in the follow-up plate 5 into a pump 11, which is located above the follow-up plate 5 and which supplies the constituent 3 into a line 12.

The line 12 branches into two control valves 13 and 14. These are 4-port/2-way valves. The control valve 13 is connected to the storage unit space of a first cylinder 15 via two lines 12a and 12b comprising two accesses. The other control valve 14 is connected to a storage unit space of a second cylinder 16 via two lines 12c and 12d comprising two accesses. The provision of two accesses to the cylinders 15 and 16 favors a complete material exchange in the cylinders by changing refilling and outputting. The two cylinders 15 and 16 have the same size and are located in a common alignment. A plunger piston (plunger) 17 dips into both cylinders 15 and 16 at the same time.

The line 12a serves to refill the cylinder 15 and is locked in the illustrated position of the control valve 13. The line 12b accommodates the constituent 3, which is ejected from the cylinder 15 by pressing it out of the cylinder 15, and leads it through the control valve 13 in the illustrated position thereof into a line 18, in which a non-return valve 19 is located. The line 18 empties into a dynamic mixer 20, which has two clamps, e.g., as mixing elements 38, which protrude from a mixing shaft 37, which is driven by a motor 46.

The line 12d serves to refill the second cylinder 16 and is connected to the line 12 in the illustrated position of the control valve 14, so that the cylinder 16 can be refilled. The line 12c is connected to the line 18, which empties into the dynamic mixer 20, via the second control valve 14. The line 12c is interrupted in the illustration position of the control valve 14.

The two lines 12b and 12c are in each case secured by means of an overpressure valve 21.

In the illustrated position of the control valves 13 and 14, the cylinder 16 is refilled, whereby the plunger piston 17 is shifted from the cylinder 16 to the cylinder 15, dips deeper into the cylinder 15 and presses the constituent 3 located therein into the line 12b. After preferably simultaneously switching over the control valves 13 and 14, the mode of operation reverses: the cylinder 15 is refilled via the line 12a. The plunger 17 is shifted to the opposite cylinder 16, dips deeper into said cylinder 16 and displaces some of the constituent 3 of the paste-like mass into the line 12d and further into the line 18 towards the mixer 20.

In a modified embodiment, the plunger piston 17 is provided with a separately controllable drive, e.g. with a spindle drive, which engages with an arm 26, which is attached to the plunger piston 17. The same applies to the plunger piston 17' of the two cylinders 15' and 16', which is provided with an arm 26'.

The second constituent 4 of the paste-like mass is located in the second container 2 and is supplied out of it in the same manner as the first constituent 3 is supplied out of the first container 1. The devices used for this are thus identified with the same reference numerals, which are provided with a line.

The second constituent 4 is supplied into two cylinders 15' and 16' in the same manner and reaches from there into a line 18', which empties into the mixer 20 as does the line 18. A 2-port/2-way valve 22, which has two positions, is located in the line 18': in the illustrated position, it interrupts the line 18'; in the other position the line 18' is continuous.

A line 23, in which a 2-port/2-way valve 24 is located, leads from the dynamic mixer 20 to a nozzle 25. The control valve 24 has two positions. In the illustrated position, it interrupts the line 23; in the other position, it makes the line 23 continuous. The control valve 24 provides for an interruption of the supply of the paste-like mass, which has been mixed from the two constituents 3 and 4, into the direct vicinity of the nozzle 25. This is advantageous for avoiding the back-flow of the mass when the injection process is interrupted.

The control valves 13, 14, 13', 14', 22 and 24 are magnetic valves.

Preferably, the cylinders 15, 16, 15' and 16' have the same size. The proportion, in which they supply the constituents 3 and 4 to the mixer 20, can be determined in that the cross sections of the plungers 17 and 17' are chosen to be different. In the case of an intended mixing ratio of nine to one correspondingly with a cross section ratio of nine to one under the condition that the two plungers 17 and 17' move at the same speed, which can be attained by means of a mechanical compulsory synchronization.

The lines 12b and 18, the mixer 20, the line 23 and the control valve 24 represent a "first" supply path with reference to the cylinder 15. The lines 12c and 18, the mixer 20, the line 23 and the control valve 24 represent a "first" supply path with reference to the cylinder 16. The lines 12b', 18', the mixer 20 and the line 23 represent a "first" supply path with reference to the cylinder 15'. The lines 12c' and 18', the mixer 20 and the line 23 represent a "first" supply path with reference to the cylinder 16'. The lines 12 and 12a represent a "second" supply path with reference to the cylinder 15. The lines 12 and 12d represent a "second" supply path with reference to the cylinder 16. The lines 12' and 12'a represent a "second" supply path with reference to the cylinder 15' and the lines 12' and 12'd represent a "second" supply path with reference to the cylinder 16'.

The cylinders 15, 16, 15', 16', all of the control valves 13, 14, 13', 14', 22 and 24, the mixer 20 and the nozzle 25 are preferably assembled on a common movable support and can be moved along the edge of an insulated glass pane together with the nozzle 25.

Figure 2:
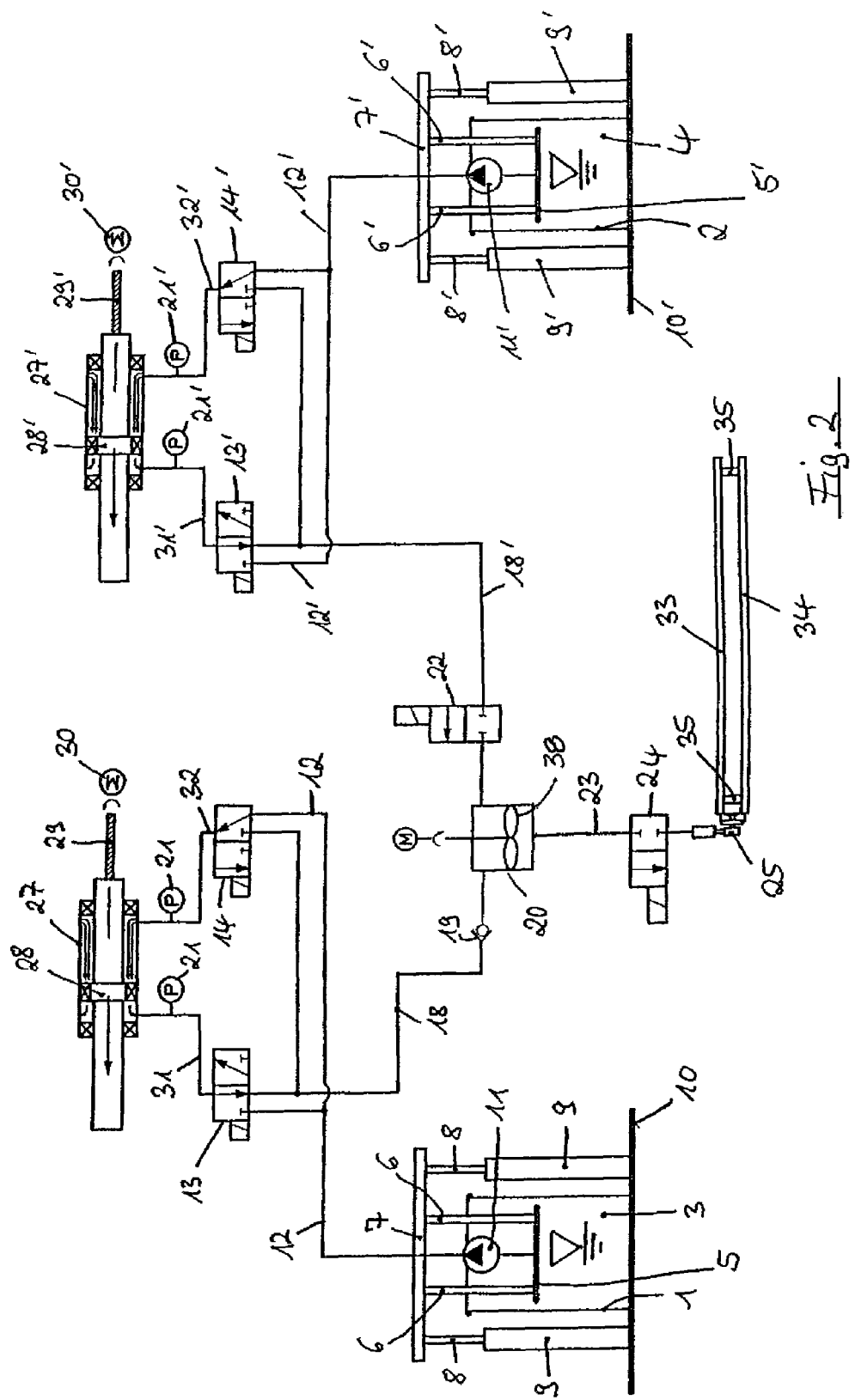
FIG. 2 shows a second exemplary embodiment of a device for injecting a paste-like mass into the intermediate space between two glass plates on an insulated glass pane in a similarly schematic illustration as in FIG. 1

The exemplary embodiment illustrated in FIG. 2 differs from the exemplary embodiment illustrated in FIG. 1 in that, instead of the cylinder pairs 15 and 16 as well as 15' and 16', provision is made in each case for only one cylinder 27, 27' comprising a piston 28 or 28', respectively, which is acted upon on both sides by the constituent 3 or by the constituent 4, respectively, which, however, is not a plunger piston. A piston rod, which continues into a shaft 29, 29', which in each case can be driven by means of an electric motor 30, 30', which is preferably a servo-motor, leads out of an end of the cylinder 27 or 27', respectively.

At both sides of the piston 28, 28', the cylinder 27, 27' has an access in each case, into which one line 31, 32 or 31', 32' empties, respectively, and which comes from a 3-port/2-way valve 13, 14 or 13', 14', respectively.

In the illustrated positions of the control valves 13, 14, 13', 14', the right-hand storage unit chamber of the cylinders 27, 27' is refilled and the left-hand storage unit chamber outputs material, which reaches via the dynamic mixer 20 to the nozzle 25, through which the mixed paste-like mass can be injected into the edge joint of an insulated glass pane, which encompasses two glass plates 33 and 34, between which a frame-shaped spacer 35 is arranged. By switching over the four control valves 13, 14, 13', 14', the functions of the storage unit chambers in the cylinders 27, 27' are exchanged.

The exemplary embodiment illustrated in FIG. 2 provides for a particularly simple and compact design of the sealing device.

Figure 3:
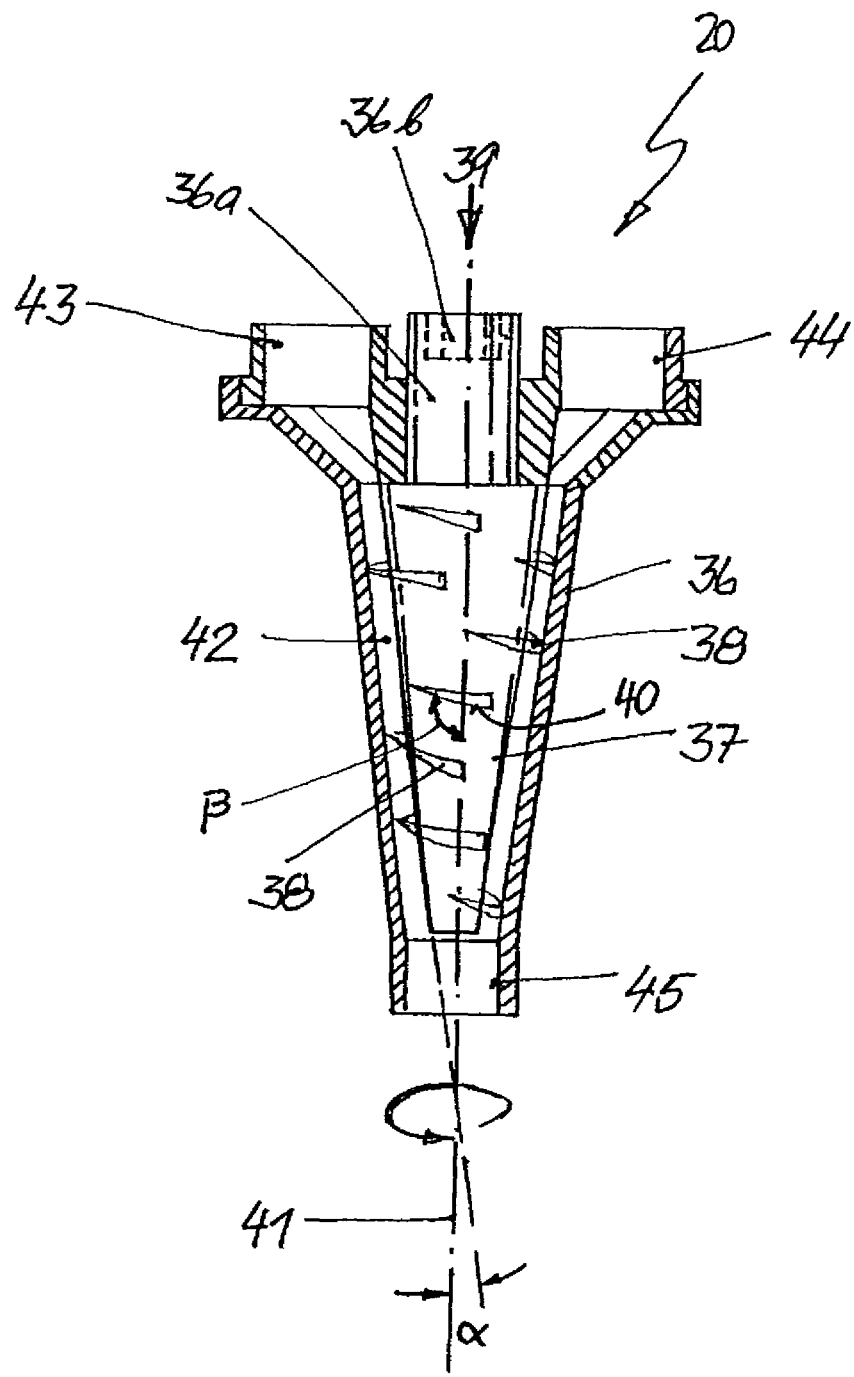
FIG. 3 shows a longitudinal section through a dynamic mixer.

FIG. 3 shows an example of a dynamic mixer 20, which has a conical mixing tube 36, in which a conical mixing shaft 37 is supported, which has a blind hole 36b comprising a hexagonal cross section in a journal 36a, which projects out of the mixing tube 36 and with which a driving shaft of a motor 46 can engage in a positive manner (see FIGS. 1 and 2).

The mixing shaft 37 has the same cone angle $\alpha$ as the mixing tube 36, so that an annular intermediate space 42 having a constant width exists between the two.

The mixing tube 37 carries radially projecting blades as mixing elements 38, which reach directly to the inner surface of the mixing tube 36. The mixing elements 38 have a surface 40, which points in supplying direction 39. The surfaces have an angle $\beta$ of incidence to the longitudinal axis 41, which differs from 90°, in such a manner that the mixing elements 38 rotating with the mixing shaft 37 effect an advance of the mass located in the mixer 20.

Two constituents of a curing sealing mass, which are to be mixed, are supplied through two inlet ports 43 and 44. The mixture leaves the mixer 20 through an outlet 45.

| List of Reference Numerals: | |
|---|---|
| 1. | container |
| 2. | container |
| 3. | constituent |
| 4. | constituent |
| 5, 5' | follow-up plate |
| 6, 6' | rod |
| 7, 7' | traverse |
| 8, 8' | piston rod |
| 9, 9' | cylinder |
| 10, 10' | base plate |
| 11, 11' | pump |
| 12, 12' | line |
| 12a, 12'a | line |
| 12b, 12'b | line |
| 12c, 12'c | line |
| 12d, 12'd | line |
| 13, 13' | control valve |
| 14, 14' | control valve |
| 15, 15' | cylinder |
| 16, 16' | cylinder |
| 17, 17' | plunger piston (plunger) |
| 18, 18' | line |
| 19. | return valve |
| 20. | dynamic mixer |
| 21, 21' | overpressure valve |
| 22. | control valve |
| 23. | line |

-continued

| List of Reference Numerals: | |
|---|---|
| 24. | control valve |
| 25. | nozzle |
| 26, 26' | arm |
| 27, 27' | cylinder |
| 28, 28' | piston |
| 29, 29' | shaft |
| 30, 30' | electric motor |
| 31, 31' | line |
| 32, 32' | line |
| 33. | glass plate |
| 34. | glass plate |
| 35. | spacer |
| 36. | mixing tube |
| 36a. | journal |
| 36b. | blind hole |
| 37. | mixing shaft |
| 38. | mixing elements |
| 39. | supply direction |
| 40. | surface of 38 |
| 41. | longitudinal axis |
| 42. | annular intermediate space |
| 43. | inlet port |
| 44. | inlet port |
| 45. | outlet |
| 46. | motor |
| α. | angle |
| β. | angle |

The invention claimed is:

1. A device for injecting a strand of a paste-like curing mass, said paste-like curing mass being formed from a plurality of constituents, said device comprising;
a nozzle for injecting the strand into an intermediate space of an edge joint between two spaced apart glass plates of an insulated glass pane;
a storage unit for each of the constituents of the paste-like curing mass, each storage unit being connected to the nozzle by a supply path; and
a dynamic mixer disposed in said supply path for receiving and mixing the constituents of the paste-like curing mass.

2. The device according to claim 1, wherein the dynamic mixer has a cylindrical or truncated cone-shaped mixing tube, in which a drivable mixing shaft is arranged, which is provided with mixing elements, which protrude from the mixing shaft.

3. The device according to claim 2, wherein the mixing elements protrude radially from the mixing shaft.

4. The device according to claim 2, wherein the mixing elements are arranged around the mixing shaft in a helical mariner.

5. The device according to claim 2, wherein the mixing elements are blades.

6. The device according to claim 1, wherein the mixer has blades as mixing elements.

7. The device according to claim 2, wherein the mixing elements are embodied in a shovel-like manner.

8. The device according to claim 2, wherein the mixing elements have surfaces, which point in supply direction and which are arranged at an angle ($\beta$) to the longitudinal axis of the mixing shaft, which angle ($\beta$) differs from 90°, so that they effect an advance of the paste-like mass in response to a driven mixing shaft.

9. The device according to claim 2, wherein the mixing elements extend up to the interior peripheral wall of the mixing tube.

10. The device according to claim 1, wherein the mixer encompasses a mixing tube, in which a worm is arranged so as to be capable of being driven.

11. The device according to claim 10, wherein the edge of the worm located radially outside extends up to the interior peripheral wall of the mixing tube.

12. The device according to claim 1, wherein the flow cross section of the mixer and its drive power are designed for a throughput of the paste-like mass of at least 0.5 l/min.

13. The device according to claim 1, wherein the flow cross section of the mixer and its drive power are designed for a throughput of the paste-like mass of at least 2 l/min, preferably of at least 3 l/min.

14. A method of injecting a strand of a paste-like mass into an intermediate space of an edge joint between two spaced apart glass plates to form an insulated glass pane, the method comprising:
providing a plurality of storage units for a plurality of different constituents of the paste-like curing mass;
providing a nozzle, out of which the paste-like curing mass can escape;
providing a supply path for connecting the storage units to the nozzle;
providing displacement devices, which engage the storage units;
activating the displacement devices to displace the constituents of the paste-like curing mass out of a respective storage unit into the supply path;
providing a dynamic mixer, arranged in the supply path, for receiving and mixing the constituents of the paste-like curing mass; and
ejecting the paste-like curing mass from the nozzle into said space between the two glass-plates.

15. The method according to claim 14 in which the paste-like curing mass is a curing mass formed from two constituents.

16. The method according to claim 15 for the processing of polyurethane.

17. A device for injecting a strand of a paste-like curing mass, said paste-like curing mass being formed from a plurality of constituents, said device comprising;
a nozzle for injecting the strand into an intermediate space of an edge joint between two spaced apart glass plates of an insulated glass pane;
a storage unit for each of the constituents of the paste-like curing mass, each storage unit being connected to the nozzle by a supply path; and
a dynamic mixer disposed in said supply path for receiving and mixing the constituents of the paste-like curing mass, said mixer having a cylindrical or truncated cone-shaped mixing tube, in which a drivable mixing shaft is arranged, wherein said drivable mixing shaft is provided with mixing blades, which mixing blades protrude radially from and are arranged around the mixing shaft in a helical manner and have surfaces, which point in a supply direction and are arranged at an angle ($\beta$) to the longitudinal axis of the mixing shaft, which angle ($\beta$) differs from 90°, so that said mixing blades effect an advance of the paste-like curing mass in response to a driven mixing shaft and wherein the flow cross section of the mixer and its drive power are designed for a throughput of the paste-like curing mass of at least 0.5 l/min.

18. The device according to claim 17, wherein the mixing blades extend up to the interior peripheral wall of the mixing tube.

* * * * *